United States Patent
Kwon et al.

(10) Patent No.: US 11,745,813 B2
(45) Date of Patent: Sep. 5, 2023

(54) SYSTEM AND METHOD FOR VEHICLE INSPECTION

(71) Applicants: HYUNDAI MOTOR COMPANY, Seoul (KR); KIA MOTORS CORPORATION, Seoul (KR)

(72) Inventors: Tae Sung Kwon, Gwangju (KR); Gun Son, Gwangju (KR); Kyungbae Yoon, Seoul (KR); Yeon Ji Choi, Seoul (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 415 days.

(21) Appl. No.: 17/109,467

(22) Filed: Dec. 2, 2020

(65) Prior Publication Data

US 2021/0358235 A1 Nov. 18, 2021

(30) Foreign Application Priority Data

May 13, 2020 (KR) .................... 10-2020-0057106

(51) Int. Cl.
| | |
|---|---|
| *B62D 65/00* | (2006.01) |
| *G07C 5/08* | (2006.01) |
| *G07C 5/00* | (2006.01) |
| *B60R 16/023* | (2006.01) |
| *B60R 25/20* | (2013.01) |
| *B60R 16/033* | (2006.01) |

(Continued)

(52) U.S. Cl.
CPC .............. *B62D 65/005* (2013.01); *B60J 1/17* (2013.01); *B60Q 1/44* (2013.01); *B60R 16/0234* (2013.01); *B60R 16/033* (2013.01); *B60R 25/20* (2013.01); *G07C 5/008* (2013.01); *G07C 5/0808* (2013.01)

(58) Field of Classification Search
CPC .. G07C 5/0808; G07C 5/008; G07C 2205/02; B60J 1/17; B60Q 1/30; B60Q 1/44; B60Q 1/302; B60R 16/0234; B60R 16/033; B60R 25/20; B60R 16/023; G01M 17/007; G01M 3/02; B62D 65/005; G01R 31/006; G08C 17/02; G01C 21/3407; H04L 2012/40273
See application file for complete search history.

(56) References Cited

U.S. PATENT DOCUMENTS

2012/0119747 A1* 5/2012 Sauerwine ......... G01R 31/3835
324/432

* cited by examiner

*Primary Examiner* — Michael V Kerrigan
(74) *Attorney, Agent, or Firm* — MCDONNELL BOEHNEN HULBERT & BERGHOFF LLP

(57) ABSTRACT

An automated vehicle inspection system includes a diagnostic terminal mounted in a vehicle and connected to an engine control unit (ECU) of the vehicle, sequentially operating individual electric components through the ECU based on stored electric component inspection items while the vehicle passes through a watertight booth and receiving individual operating currents measured to determine whether the electric components normally operate, a transceiver connecting to the diagnostic terminal and a wireless diagnostic communication network through an antenna disposed in the watertight booth process line, and an inspector recognizing a vehicle ID of a vehicle that enters the watertight booth, transmitting inspection items according to a vehicle type and specification of the vehicle ID to the diagnostic terminal through the diagnostic communication (Continued)

network, and recognizing a vehicle ID of a vehicle that leaves the watertight booth to collect inspection results determined in the diagnostic terminal.

17 Claims, 7 Drawing Sheets

(51) Int. Cl.
*B60J 1/17* (2006.01)
*B60Q 1/44* (2006.01)

FIG. 5
(Example of individual inspection according to automated inspection algorithm of present disclosure)
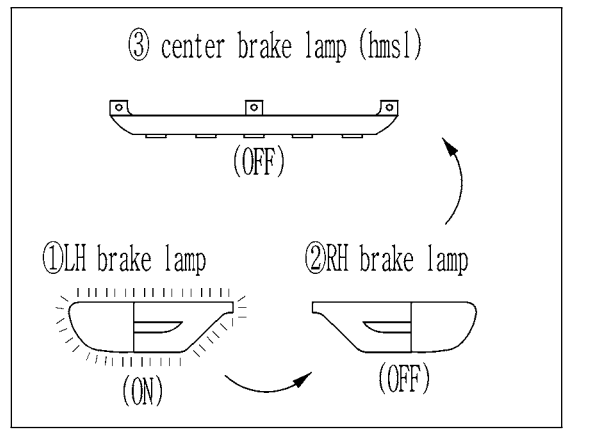
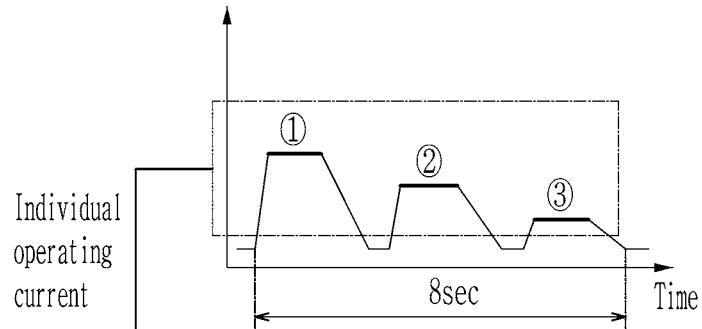
<Effect of reducing dispersion of measured current values in individual inspection>

FIG. 6A
Prior art

| classification | sum | manual current | automatic current | sensor data | DTC inspection | additional function |
|---|---|---|---|---|---|---|
| vehicle type1 | 57 | 13 | 13 | 7 | 23 | 1 |
| vehicle type2 | 60 | 12 | 13 | 9 | 25 | 1 |
| vehicle type3 | 51 | 9 | 13 | 8 | 20 | 1 |
| vehicle type4 | 49 | 7 | 13 | 8 | 20 | 1 |
| vehicle type5 | 54 | 5 | 21 | 3 | 25 | 0 |

FIG. 6B (Present invention)

| classification | sum | manual current | automatic current | sensor data | DTC inspection | additional function |
|---|---|---|---|---|---|---|
| vehicle type1 | 66 (+9) | 0 (-13) → | 35 (+22) | 7 | 23 | 1 |
| vehicle type2 | 68 (+8) | 0 (-12) → | 33 (+20) | 9 | 25 | 1 |
| vehicle type3 | 60 (+9) | 0 (-9) → | 31 (+18) | 8 | 20 | 1 |
| vehicle type4 | 58 (+9) | 0 (-7) → | 29 (+16) | 8 | 20 | 1 |
| vehicle type5 | 64 (+10) | 0 (-5) → | 36 (+15) | 3 | 25 | 0 |

FIG. 7
Prior art
(Example of simultaneous inspection according to brake operation of related art)
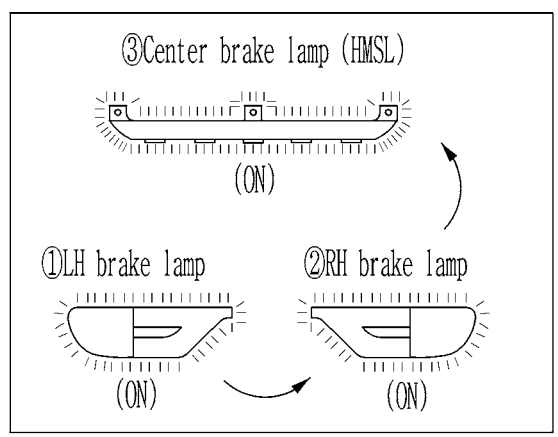
Perform simultaneous inspection
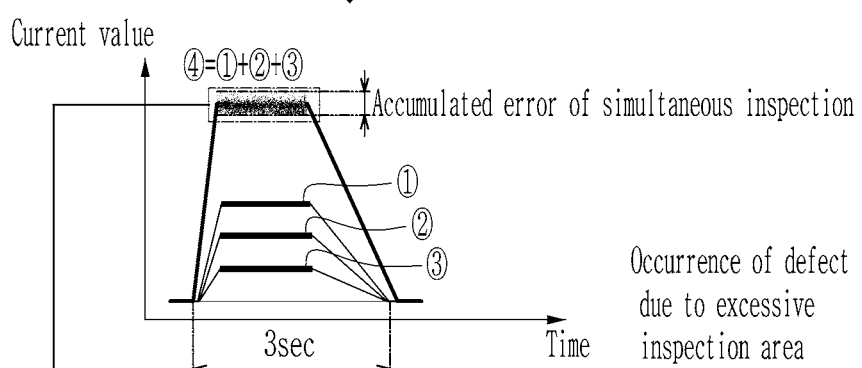
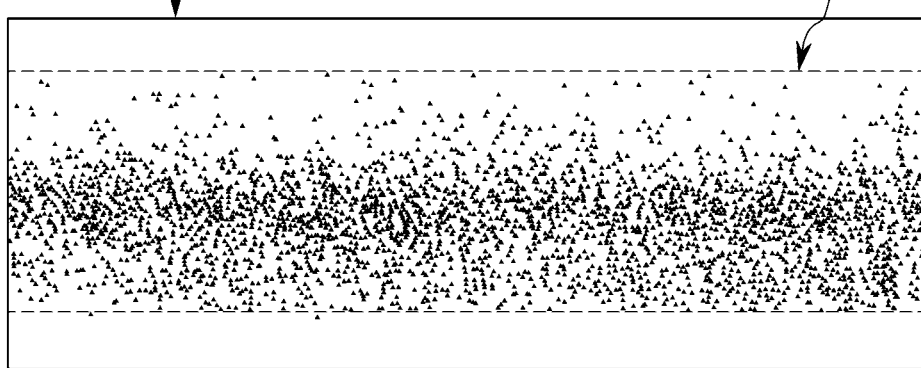
<Phenomenon of excessive dispersion of measured current values in simultaneous inspection>

SYSTEM AND METHOD FOR VEHICLE INSPECTION

CROSS REFERENCE TO RELATED APPLICATIONS

This application claims priority to and the benefit of Korean Patent Application No. 10-2020-0057106 filed in the Korean Intellectual Property Office on May 13, 2020, the entire contents of which are incorporated herein by reference.

BACKGROUND

(a) Field

The present disclosure relates to a system and method for vehicle inspection, and more particularly, to a system and method for vehicle inspection, which automates inspection of electric components of finished vehicles in a manufacturing plant.

(b) Description of the Related Art

Generally, in a vehicle manufacturing plant, a finished vehicle, which has been completely assembled, enters a final inspection line at the end of a process line, in which electronic inspection is subsequently performed on various electric components applied according to specifications of each vehicle.

The electronic inspection performed in the final inspection line includes an operation in which the operator (inspector) opens a hood of a vehicle and installs a current meter on a battery, an operation in which the operator connects a diagnostic terminal to a vehicle OBD connector, an F-scan process operation in which the operator operates an electric component by operating the vehicle and the diagnostic terminal and measures a current through the current meter, an operation in which a diagnostic trouble code (DTC) inspection is performed on the electric component, and an operation in which the current meter and the diagnostic terminal are removed, and the like.

The electronic inspection in the final inspection line is mostly performed manually by a plurality of workers and needs to be performed according to a process cycle of a continuous line.

For this reason, the electronic inspection of the related art may have measurement errors due to aging of the current meter used by each of a plurality of operators, may have problems due to simultaneously inspecting multiple items to perform inspection according to a determined process cycle in spite of a large number of electric components to be inspected, human error due to variations of inspection methods and skill/carelessness of operators, and the like.

FIG. 7 shows a problem that arises when multiple items are simultaneously inspected during the electronic inspection of the related art.

Referring to FIG. 7, in the electronic inspection of the related art, operational states of ①left (LH) brake lamp, ② right (RH) brake lamp and ③ central brake lamp (high mounted stop lamp (HMSL)) are simultaneously inspected by measuring an operating current of a battery according to operation of a vehicle brake.

Here, the current meter detects a current value ④ as the sum of operating currents of ①, ② and ③, and the diagnostic terminal checks a normal operation by comparing the sum with upper/lower limits of an allowable range.

However, when electric components are simultaneously inspected with a limited process cycle time, excessive current measurement value dispersion occurs due to accumulated errors of measurement data, degrading accuracy and reliability of the inspection.

In addition, even if an error occurs due to a defect/breakdown of at least one of the electric components, it is often impossible to track the error occurrence and defect.

Such an electric load inspection problems of the related art may cause field claims for mass-produced vehicles, and thus a method which may be able to improve accuracy and reliability of electric load inspection is required.

The above information disclosed in this Background section is only for enhancement of understanding of the background of the disclosure, and therefore it may contain information that does not form the prior art that is already known in this country to a person of ordinary skill in the art.

SUMMARY

The present disclosure has been made in an effort to provide a system and method for vehicle inspection having advantages of improving inspection accuracy and reliability by automating individual inspection of an electric load through a diagnostic terminal mounted in a vehicle during a watertight booth process of a manufacturing plant.

An exemplary embodiment of the present disclosure provides an automated vehicle inspection system utilizing a watertight booth process of a manufacturing plant, including a diagnostic terminal mounted in a vehicle and connected to an engine control unit (ECU) of the vehicle through vehicle communication, sequentially operating individual electric components through the ECU based on a stored electric component inspection items while the vehicle passes through a watertight booth and receiving individual operating currents measured accordingly to determine whether the electric components normally operate, a transceiver connecting the diagnostic terminal and wireless diagnostic communication through an antenna disposed in the watertight booth process, and an inspector recognizing a vehicle ID of a vehicle that enters the watertight booth, transmitting inspection items according to a vehicle type and specification of the vehicle ID to the diagnostic terminal through the diagnostic communication, recognizing a vehicle ID of a vehicle that leaves the watertight booth to collect inspection results determined in the diagnostic terminal.

The diagnostic terminal may be a wireless on-board diagnostics (OBD)-based terminal, and is equipped with an electric load inspection program for inspecting an individual electric component based on the inspection items.

The diagnostic terminal may include a vehicle communication module connected to the ECU through the vehicle communication via a gateway of the vehicle, a wireless diagnostic communication module connected to the antenna of the transceiver through diagnostic communication of a short-range wireless communication method, a position recognition module measuring a position of the vehicle using at least one of differential global positioning system (DGPS) and an ultra-wideband (UWB), a memory module storing an electric load inspection program for vehicle inspection, the inspection items, and the inspection results, and a control module recognizing the position of the vehicle that enters the watertight booth through the position recognition module and controlling electric load inspection according to execution of the electric load inspection program.

The vehicle communication module may transmit transmits an operating signal for each electric component according to the inspection items to the ECU through the vehicle communication and receive an operating current measured by a battery sensor according to an operation of a corresponding electric load from the ECU.

The wireless diagnosis communication module may be connected to a first antenna provided on an entrance side of the watertight booth through first diagnostic communication to receive the inspection items and may be connected to a second antenna provided on an exit side of the watertight booth to transmit the inspection results.

The position recognition module may recognize a watertight booth entry position, watertight booth internal position, and watertight booth exit position of the vehicle based on vehicle position information and map information of a process line.

The control module may generate an inspection command message including an electric component identification code, an operating signal, and an operation time according to an inspection sequence based on the inspection items and transmit the generated inspection command message to the ECU.

The control module may sequentially transmit a left (LH) brake lamp, a right (RH) brake lamp, and a central brake lamp (high mounted stop lamp (HMSL)) inspection command messages according to the inspection items through vehicle communication and compare received individual operating currents with reference ranges set for the respective lamps to determine whether the individual operating currents are normal within an upper/lower limit.

The inspector may recognize the vehicle ID of the vehicle that enters the watertight booth through a first scanner (SC #1) installed on an entrance side of the watertight booth, may be connected to the diagnostic terminal through first diagnostic communication, and may transmit the inspection items matched to the vehicle ID.

The inspector may recognize the vehicle ID of the vehicle that leaves the watertight booth through a second scanner (SC #2) installed on an exit side of the watertight booth, may be connected to the diagnostic terminal through second diagnostic communication, and may collect inspection results matched to the vehicle ID.

The automation system may further include a manufacturing execution system (IVIES) matching and managing the electric component inspection items applied to a vehicle according to a vehicle type and specification of the vehicle mass-produced in the manufacturing plant, an OBD ID of the diagnostic terminal mounted in the vehicle, and the vehicle ID, and providing the matched electric component inspection items, the OBD ID, and the vehicle ID to the inspector.

The inspector may inquire the IVIES about vehicle information by a vehicle ID recognized at each spot of the entrance and exit of the watertight booth to recognize a matched OBD ID and may be connected to diagnostic communication through authentication of the OBD ID of the diagnostic terminal requesting access from each antenna.

Another exemplary embodiment of the present disclosure provides an automated vehicle inspection method utilizing a diagnostic terminal mounted in a vehicle completely assembled in a process line, including a) receiving electric component inspection items matched to a vehicle ID from an inspector when first diagnostic communication is connected through a first antenna provided on an entrance side of a watertight booth during transportation of the vehicle, b) recognizing a position of the vehicle and initiating automated inspection according to an electric load inspection program when a watertight entry position is recognized, c) sequentially operating individual electric components based on the inspection items while the vehicle is passing through the watertight booth and inspecting corresponding individual operating currents to determine whether the individual electric components normally operate, and d) transmitting the vehicle ID and determined inspection results to the inspector when second diagnostic communication is connected through a second antenna provided on an exit side of the watertight booth.

The operation b) may include causing the vehicle to enter an IG ON mode and supplying power to various electric loads; transmitting a door glass inspection signal to the ECU through the vehicle communication, before entering the watertight booth, to operate a door glass; and receiving an operating current measured in a battery sensor of the vehicle.

The operation c) may include sequentially transmitting left (LH) brake lamp, right (RH) brake lamp, and central brake lamp (high mounted stop lamp (HMSL)) inspection command messages based on the inspection items through the vehicle communication and receiving corresponding individual operating currents; and comparing the individual operating currents with reference ranges set for the respective lamps to determine a normal operation and storing collected inspection results.

The automated vehicle inspection method may further include: inspecting an operation of a tailgate latch and door unlock when the position of the vehicle is recognized and a watertight booth entry/exit spot is recognized, between operation b) and operation c).

The operation c) may include recording an item failed (NG) for inspection in reporting information of the inspection result.

According to an exemplary embodiment of the present disclosure, electric load inspection with improved accuracy and reliability may be performed by automating the existing manual current inspection according to an additionally secured process cycle time in the watertight booth and adding a major safety component related inspection item.

In addition, quality inspection management specifications of electric components may be strengthened by preventing errors due to external factors when inspecting an operating current of the electric components and ensuring consistency of inspections results according to individual component inspection, and field claims may be improved by preventing defective products.

In addition, since electric component inspection of a vehicle is automated in the final inspection line utilizing the watertight booth, a spare plant site due to elimination of the final inspection line may be secured and cost reduction effects based on reduction in manpower may be expected.

BRIEF DESCRIPTION OF THE FIGURES

FIG. 5 shows an example of individual electric load inspection according to an automated inspection algorithm according to an exemplary embodiment of the present disclosure.

FIG. 6A shows a manual inspection of the related art.

FIG. 6B shows an automated electric load item according to an embodiment of the present disclosure.

FIG. 7 shows a problem that arises when multiple items are simultaneously inspected during electronic inspection of the related art.

DETAILED DESCRIPTION

Figure 1:
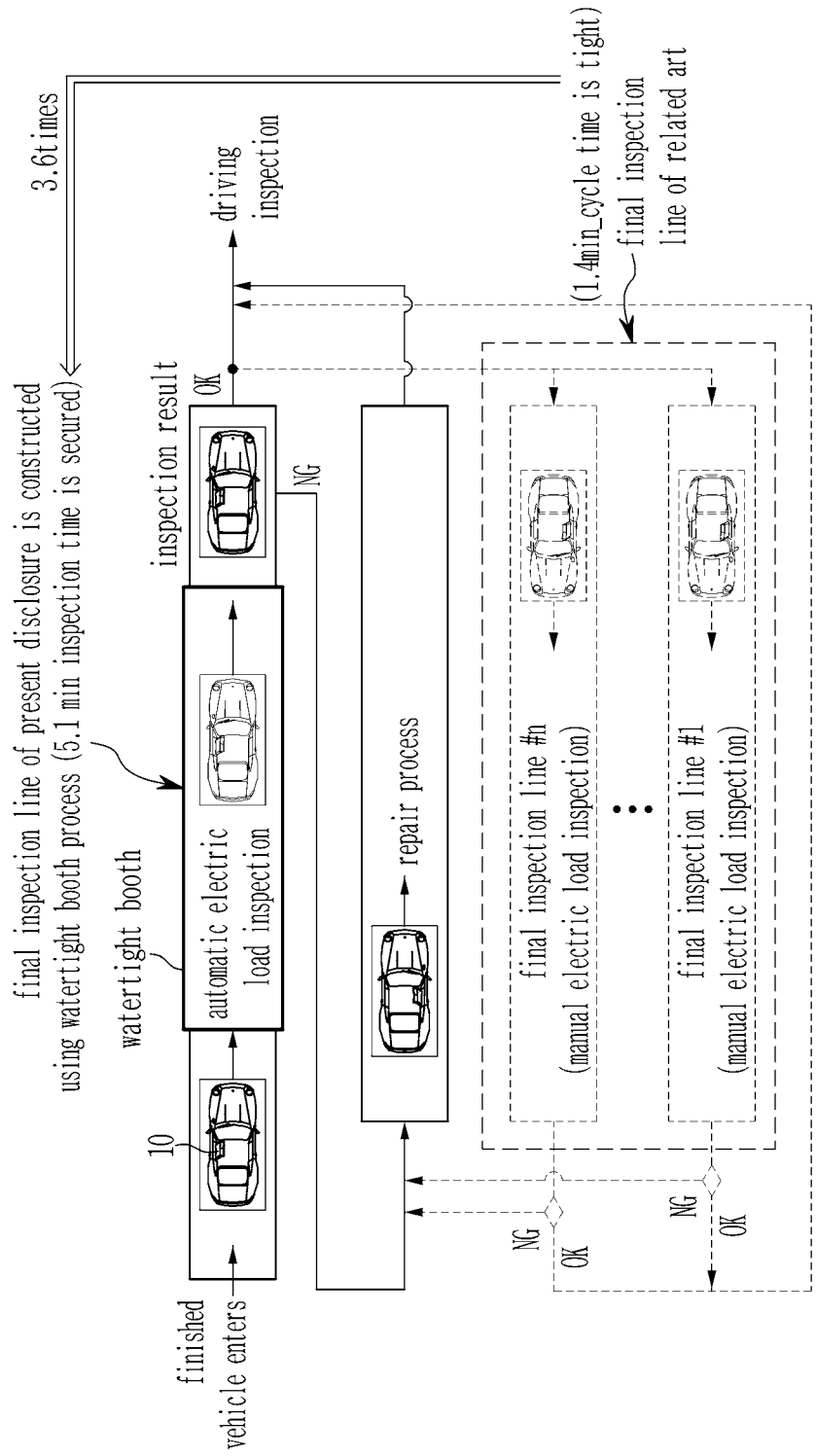
FIG. 1 shows a layout structure of a final inspection line to which an automated vehicle inspection system according to an exemplary embodiment of the present disclosure is applied.

In the following detailed description, only certain exemplary embodiments of the present disclosure have been shown and described, simply by way of illustration. As those skilled in the art would realize, the described exemplary embodiments may be modified in various different ways, all without departing from the spirit or scope of the present disclosure. Accordingly, the drawings and description are to be regarded as illustrative in nature and not restrictive. Like reference numerals designate like elements throughout the specification.

Throughout the specification, unless explicitly described to the contrary, the word "comprise", and variations such as "comprises" or "comprising", will be understood to imply the inclusion of stated elements but not the exclusion of any other elements. In addition, the terms "-er", "-or", and "module" described in the specification mean units for processing at least one function and operation, and may be implemented by hardware components or software components, and combinations thereof.

Throughout the specification, terms such as first, second, A, B, (a), (b), etc., may be used to describe various components, but these components should not be limited by the terms. Such terms are used for merely discriminating the corresponding elements from other elements and the corresponding elements are not limited in their essence, sequence, or precedence by the terms.

When a component is mentioned as being "connected" to or "accessing" another component, this may mean that it is directly connected to or accessing the other component, but it is to be understood that another component may exist therebetween. On the other hand, when a component is mentioned as being "directly connected" to or "directly accessing" another component, it is to be understood that there are no other components in-between.

The terminology used herein is for the purpose of describing particular exemplary embodiments only and is not intended to be limiting of the disclosure. As used herein, the singular forms "a", "an," and "the" are intended to include the plural forms as well, unless the context clearly indicates otherwise.

Hereinafter, an automated vehicle inspection system and method thereof according to an exemplary embodiment of the present disclosure will be described in detail with reference to the accompanying drawings.

FIG. 1 shows a layout structure of a final inspection line to which the automated vehicle inspection system according to an exemplary embodiment of the present disclosure is applied.

Figure 2:
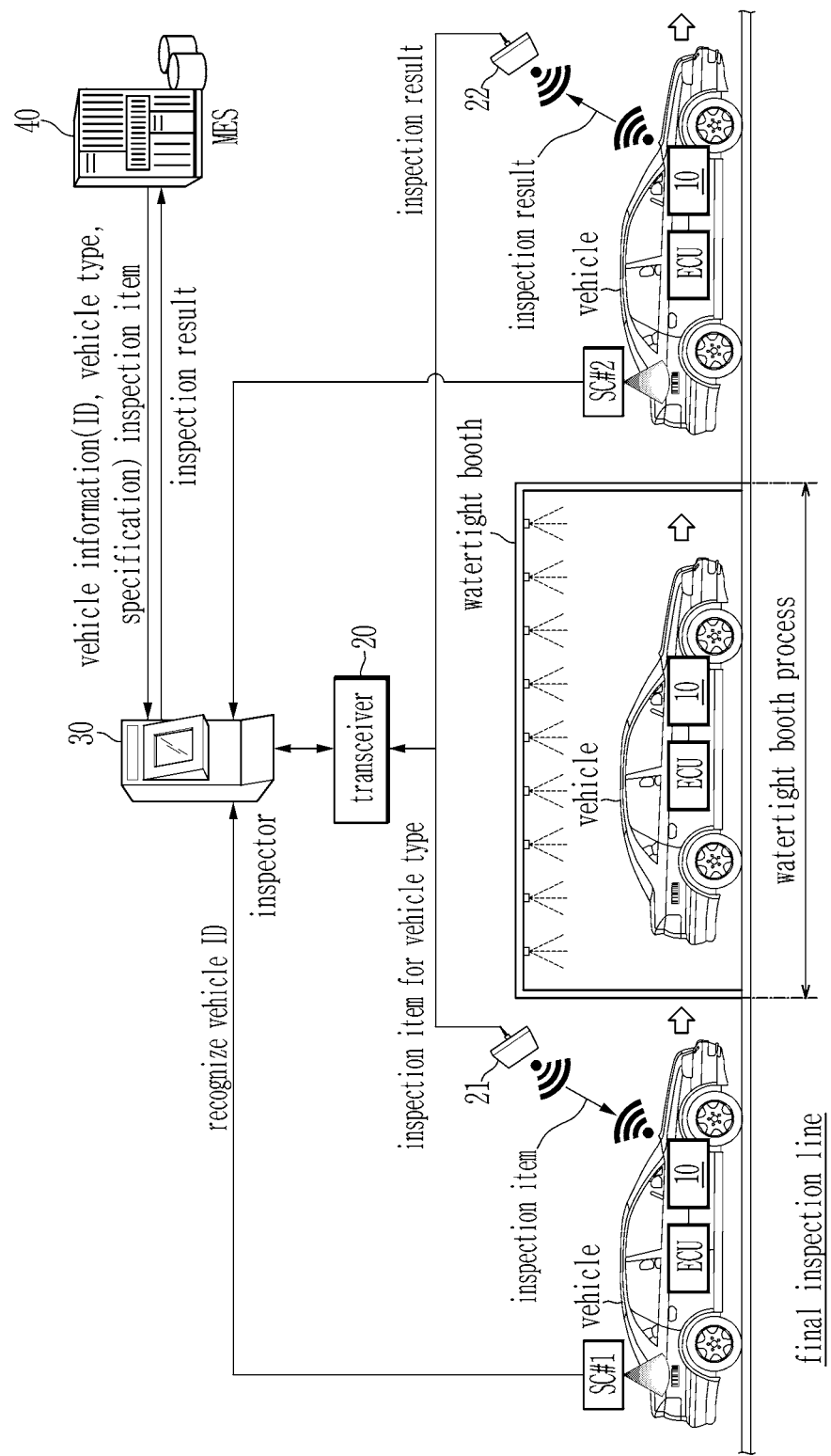
FIG. 2 schematically shows a configuration of an automated vehicle inspection system using a watertight booth according to an exemplary embodiment of the present disclosure.

FIG. 2 schematically shows a configuration of an automated vehicle inspection system utilizing a watertight booth according to an exemplary embodiment of the present disclosure.

Referring to FIG. 1, in the related art, a plurality of final inspection lines (indicated by the dotted lines) for manually inspecting an electric load by an operator are arranged at the end of a process line in a manufacturing plant. Improving this, in a process line of a manufacturing plant according to an exemplary embodiment of the present disclosure, a final inspection line (indicated by the solid line) is constructed using a watertight booth process, and an automated electric load inspection is performed within the watertight booth.

The watertight booth, as a tunnel-type structure in which a large number of nozzles are arranged, is a process facility that inspects watertightness by spraying water to a vehicle passing through a conveyor. In order to check the watertightness, the vehicle must be sprayed with a sufficient amount of water, and thus the vehicle stays in the watertight booth for a certain period of time without any special work.

Utilizing this, the automated vehicle inspection system according to an exemplary embodiment of the present disclosure aims to perform an automated vehicle electric load inspection for the certain period of time while the vehicle stays in the watertight booth. Through this, a space of the multiple final inspection lines of the related art may be eliminated, and the effect of reducing manpower, equipment, and cost for each manual electric load inspection may be obtained.

In order to obtain such purposes and effects, a facility for automating the final inspection process needs to be constructed, and thus an automated vehicle inspection system according to an exemplary embodiment of the present disclosure will be described.

Referring to FIG. 2, a vehicle inspection system (or a system for vehicle inspection) according to an exemplary embodiment of the present disclosure is a facility of a final inspection line constructed using a watertight booth process, including a diagnostic terminal 10, a transceiver 20, an inspector 30, and a manufacturing execution system (MES) 40.

The vehicle is equipped with the diagnostic terminal 10 based on wireless on-board diagnostics (OBD), is assembled through several production lines along the conveyor, and then enters the final inspection line for inspection of electric components at a finished vehicle stage.

The diagnostic terminal 10 is a terminal to which an automated electric load inspection function is added by improving the wireless OBD operated in the process line. The diagnostic terminal 10 connects wired and/or wireless communication with an ECU of the vehicle through an OBD connector of the vehicle and connects wireless communication with an external inspector 30 through the transceiver 20. Hereinafter, both communications connected to the diagnostic terminal 10 are classified such that the connection with the vehicle is referred to as vehicle communication and the wireless communication with the inspector 30 through the transceiver 20 is referred to as diagnostic communication.

The diagnostic terminal 10 includes a vehicle electric load inspection program according to an exemplary embodiment of the present disclosure and executes the vehicle electric load inspection program to control individual electric load inspection according to vehicle inspection items while watertightness inspection is performed in the watertight booth.

The diagnostic terminal 10 downloads the electric component inspection items according to a vehicle type and specification (option) from the inspector 30 through first diagnostic communication connected before the vehicle enters the watertight booth The diagnostic terminal 10 sequentially inspects an operation status of electric components according to the inspection items by interworking with a vehicle controller (electronic control unit (ECU)) connected through vehicle communication for a certain period of time during which the vehicle is present in the watertight booth. Here, the diagnostic terminal 10 may secure a sufficient inspection time for the certain period of time during which the vehicle passes through the watertight booth, operate the individual electric components, and perform an automated inspection of measuring individual operating currents.

Here, in FIG. 2, one vehicle is shown in the watertight booth, but exemplary embodiments of the present disclosure are not limited thereto, and a plurality of vehicles may be present in the watertight booth further extended in a longitudinal direction in a first-in first-out manner. The electric load inspection in the watertight booth is performed by interworking with the ECU according to vehicle communication of the diagnostic terminal 10, so that the connection of the first diagnostic communication may be released.

Thereafter, when the vehicle leaves the watertight booth, the diagnostic terminal 10 connects second wireless communication and transmits an electrical load inspection result to the inspector 30, thereby terminating the electrical load inspection for the vehicle.

The transceiver 20 connects diagnostic communication with the diagnostic terminal 10 of the vehicle transferred through a plurality of antennas 21 and 22 arranged along the final inspection line and relays data transmission/reception with the inspector 30.

The transceiver 20 includes a first antenna 21 installed on an entrance side of the watertight booth and a second antenna 22 installed on an exit side thereof. The first antenna 21 and the second antenna 22 are configured as directional antennas for short-range communication and are arranged along a conveyor line along which the vehicle is moved. Bluetooth or wireless LAN may be applied as the short-range communication.

The first antenna 21 connects first diagnostic communication with the diagnostic terminal 10 of the vehicle approaching the entrance side of the watertight booth, and transmits inspection items according to a vehicle type and specification of the vehicle received from the inspector 30 to the diagnostic terminal 10.

The second antenna 22 connects the diagnostic terminal 10 of the vehicle moved to the exit side of the watertight booth and the second diagnosis communication and transmits the inspection result received from the diagnostic terminal 10 to the inspector 30 through the transceiver 20.

The inspector 30, as a computer device installed in the final inspection line and controlling an overall electric load inspection process, receives vehicle information (vehicle ID, vehicle type, specification, mounted OBD ID, etc.) according to a mass-production plan and corresponding inspection items from the IVIES 40, and stores the received information and inspection items in a database (DB).

The inspector 30 recognizes the vehicle ID of the vehicle entering the watertight booth, transmits the inspection items according to a vehicle type and specification of the vehicle ID to the diagnostic terminal 10 through diagnostic communication, recognizes a vehicle ID that leaves the watertight booth, and collects an inspection result determined by the diagnostic terminal 10.

More specifically, the inspector 30 recognizes a vehicle ID of the vehicle entering the final line through a first scanner SC #1 installed at the entrance side of the watertight booth, connects the diagnostic terminal 10 and first diagnostic communication, and transmits inspection items matched to the vehicle ID.

The inspector 30 recognizes a vehicle ID leaving the final line through a second scanner SC #2 installed at the exit side of the watertight booth, connects the mounted diagnostic terminal 10 and second diagnostic communication, and collects the inspection result matched to the vehicle ID. The first scanner SC #1 and the second scanner SC #2 may be barcode scanners that scan barcodes attached to the vehicle.

In the above description, the inspector 30 may inquire the MES 40 about vehicle information through the vehicle ID recognized at the entrance/exit of the watertight booth, recognize a corresponding OBD ID, and connect diagnostic communication through OBD ID authentication of the diagnostic terminal 10 requested to be connected to each of the antennas 21 and 22.

In addition, the inspector 30 may generate inspection result reporting information in a predetermined form based on the vehicle ID and the inspection items and share the information with the IVIES 40. In addition, the inspector 30 may output an inspection result sticker through a printer and attach the sticker to the vehicle.

The inspector 30 may transfer a vehicle that normally passes (OK) as a result of the inspection to a driving inspection process or cause a vehicle that fails (NG) in the inspection to enter a repair process (see FIG. 1). Thereafter, when the vehicle normally passes (OK) through the repair process, the vehicle may be allowed to enter a driving inspection.

The MES 40, as a server that manages the entire process line of the vehicle manufacturing plant, manages electrical component inspection items applied to vehicles according to vehicle types and specifications of vehicles being mass-produced. In addition, the MES 40 performs managing by matching the OBD ID of the diagnostic terminal 10 mounted in each vehicle and the vehicle ID, and shares inquiry of the information with the inspector 30.

Figure 3:
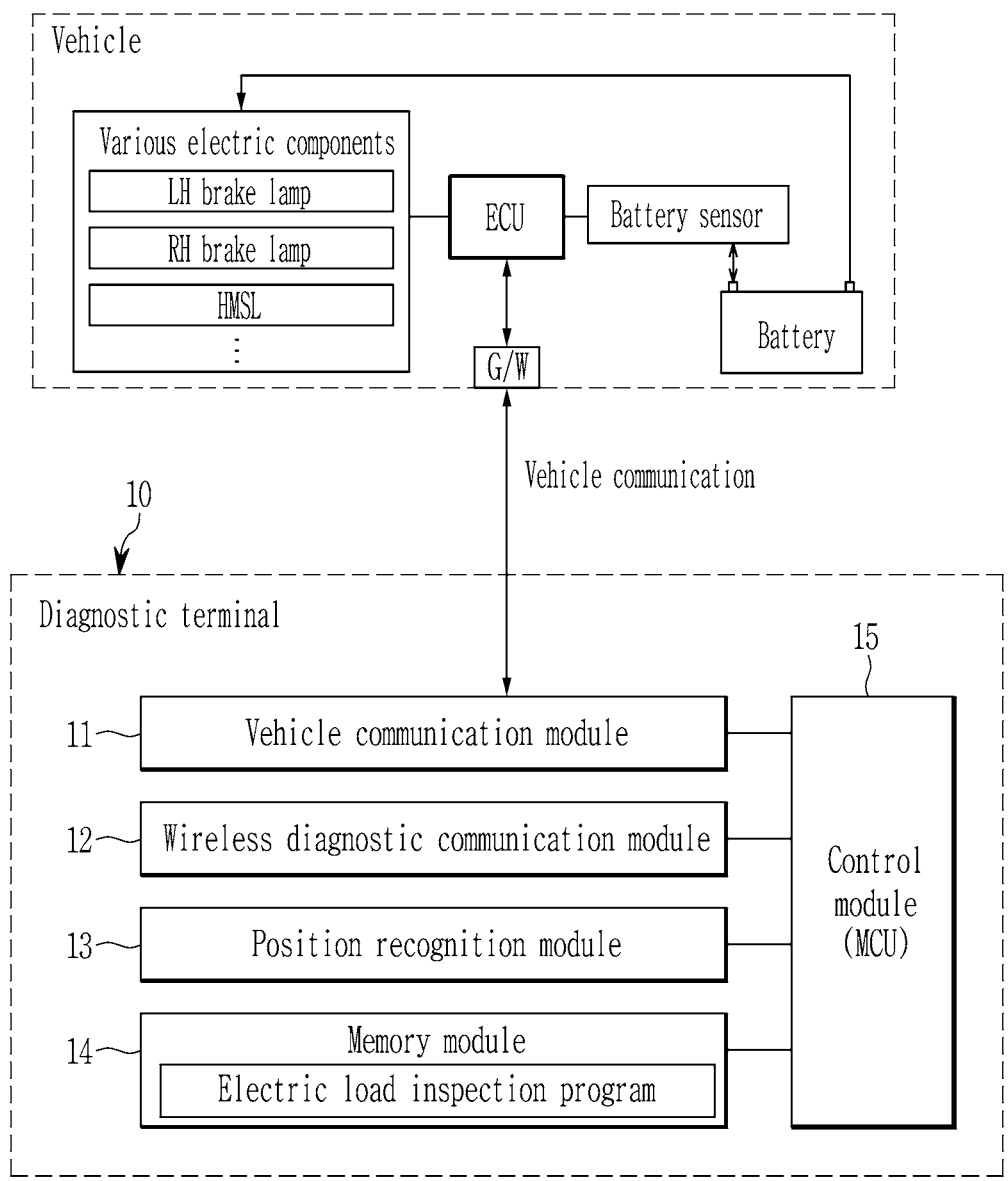
FIG. 3 is a block diagram schematically showing a configuration of a diagnostic terminal according to an exemplary embodiment of the present disclosure.

FIG. 3 is a block diagram schematically showing a configuration of a diagnostic terminal according to an exemplary embodiment of the present disclosure.

Referring to FIG. 3, the diagnostic terminal 10 according to an exemplary embodiment of the present disclosure includes a vehicle communication module 11, a wireless diagnostic communication module 12, a position recognition module 13, a memory module 14, and a control module 15.

The vehicle communication module 11 connects the ECU and vehicle communication through a gateway (G/W) of the vehicle and transmits/receives the electric load inspection signal.

The vehicle communication module 11 transmits an operating signal for each electric component according to inspection items to the ECU through vehicle communication and receives an operating current measured according to the operation of the electric load from the ECU. Here, the ECU of the vehicle may be connected to various electric components through the vehicle network (i.e., controller area network (CAN)) to apply an operating signal and may measure an operating current supplied when the electric load operates through a battery sensor mounted on a battery. For example, the electric components may include lamps such as left (LH) brake lamps, right (RH) brake lamps, high mounted stop lamps (HMSL), tail lights, headlights, and fog lights, door glass lift motors, door lock/unlock, various sensor operation states, air conditioner operation states, relay switches, valves, pumps, EPB drive, seat heating wires, air compressors, controllers (e.g., DCT inspection targets) for various functions, and the like.

According to an exemplary embodiment of the present disclosure, by measuring the operating current of the electric load through the battery sensor of the vehicle, mounting man hour of a current meter in the electric load inspection process of the related art and a measurement error problem due to aging of the current meter may be solved.

The wireless diagnostic communication module 12 may connect diagnostic communication with an antenna of the transceiver 20 according to a short-range wireless communication method.

The wireless diagnostic communication module 12 may connect the first diagnostic communication to the first antenna 21 provided on the entrance side of the watertight booth to receive the inspection items and connect the second diagnostic communication to the second antenna 22 provided on the exit side of the watertight booth to transmit electric load inspection results.

The position recognition module 13 measures indoor and outdoor vehicle positions using differential global positioning system (DGPS).

The position recognition module 13 may recognize a position of the vehicle before entering the watertight booth, a position of the vehicle inside the watertight booth, and a position after leaving the watertight booth based on high-precision vehicle position information obtained by processing GPS signals and map information of the process line.

The memory module 14 includes at least one program and data for vehicle inspection/diagnosis through the diagnostic terminal 10 and stores information generated according to an operation thereof.

In particular, the memory module 14 may store an electric load inspection program and support the control module 15 according to execution thereof to automatically perform electric load inspection according to inspection items for various vehicle types and specifications in the final inspection line.

The control module 15 may be configured as a micro controller unit (MCU) in which an algorithm for overall control of the diagnostic terminal 10 is stored.

The control module 15 may recognize a position of the vehicle on the process line through the position recognition module 13. For example, the control module 15 may determine a watertight booth entry position and an exit position of the vehicle through the position recognition module 13.

The control module 15 controls each of the modules for the purpose of automating the electric load inspection of the vehicle according to the exemplary embodiment of the present disclosure by executing the electric load inspection program.

Here, the electric load inspection program may be programmed to perform each step of the automated vehicle inspection method according to an exemplary embodiment of the present disclosure in the diagnostic terminal 10 mounted for each vehicle.

Therefore, the automated vehicle inspection method according to an exemplary embodiment of the present disclosure will be described based on the configuration of the vehicle inspection system described above, and here, a flow in which the diagnostic terminal 10 under the control of the control module 15 interworks with the inspector 30 of the final inspection line will be mainly described.

Figure 4:
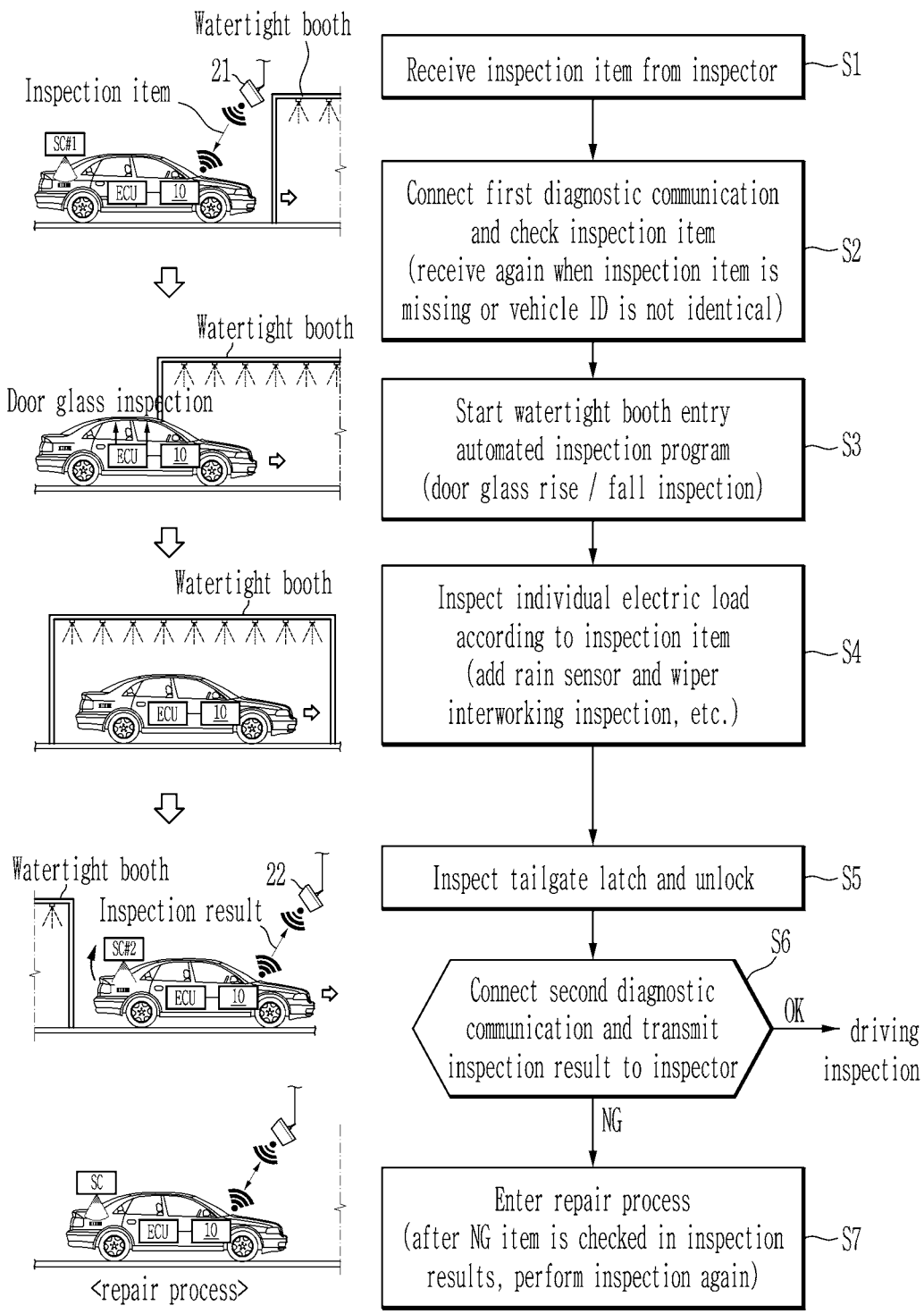
FIG. 4 is a flowchart schematically showing an automated vehicle inspection method according to an exemplary embodiment of the present disclosure.

FIG. 4 is a flowchart schematically showing an automated vehicle inspection method according to an exemplary embodiment of the present disclosure.

Referring to FIG. 4, the diagnostic terminal 10 according to an exemplary embodiment of the present disclosure receives is mounted in a vehicle, receives electric component inspection items matched to a vehicle ID from the inspector 30 connected through diagnostic communication, while on the move to the watertight booth, and stores the received electric component inspection items at S1.

When a barcode attached to the vehicle is recognized by the first scanner SC #1 located on the entrance side of the watertight booth, and the inspector 30 and the first diagnostic communication are connected through the first antenna 21, the diagnostic terminal 10 may additionally receive and check the electric component inspection items matched to the vehicle ID from the inspector 30 at S2. Here, the diagnostic terminal 10 compares the inspection items received from the inspector 30 in step S1 with the inspection items received in step S2, and if it is determined that an inspection item is missing or if the vehicle ID and the inspection items do not match, the diagnostic terminal 10 may receive the inspection items according to the vehicle ID again from the inspector 30 to update the inspection items.

When the diagnostic terminal 10 recognizes a position of the vehicle through the position recognition module 13 and recognizes a watertight booth entry position, the diagnostic terminal 10 starts automated inspection according to the electric load inspection program at S3. Here, the diagnostic terminal 10 causes the vehicle to enter an IG ON mode so that power is supplied to various electric loads. In addition, the diagnostic terminal 10 may transmit a door glass inspection signal to the ECU connected through vehicle communication before entering the watertight booth to perform a door glass lifting inspection and receive an operating current measured by a battery sensor.

When it is determined that a position of the vehicle is inside the watertight booth, the diagnostic terminal 10 sequentially operates (ON/OFF) individual electric components according to the inspection items by interworking with the ECU through vehicle communication, collects individual operating currents corresponding to operations of the individual electric components, and determines whether the electric components are normal at S4.

For example, FIG. 5 shows an example of individual electric load inspection according to an automated inspection algorithm according to an exemplary embodiment of the present disclosure.

Referring to FIG. 5, compared with the example of simultaneous inspection according to the manual brake operation of the related described above with reference to FIG. 7, a process in which the diagnostic terminal 10 inspects individual brake lamps according to inspection items without operator's intervention is illustrated.

The diagnostic terminal 10 may generate an inspection command message including an electric component identification code, an operating signal, an operation time, and the like according to an inspection sequence based on the inspection items and transmit the message to the ECU through vehicle communication. In addition, the diagnostic terminal 10 may receive an operating current measured according to an operation of an individual electric load from the ECU through the vehicle communication.

For example, the diagnostic terminal 10 sequentially transmits ①LH brake lamp, ②RH brake lamp, and ③center brake lamp (HMSL) inspection command messages through vehicle communication and receives individual operating currents ①, ②, and ③ accordingly.

The diagnostic terminal 10 compares the individual operating currents a ①, ②, and ③ of the individual electric loads with reference ranges set for the respective individual electric loads, determines whether the individual electric loads normally operate (OK/NG) within upper/lower limit, and stores collected inspection results in the memory module 14.

Here, unlike the related art of FIG. 7, dispersion of the measured operating currents and the inspection area according to the inspection of individual electric loads are reduced, thereby improving inspection accuracy and reliability. In addition, since a sufficient inspection time for a certain period of time during which the vehicle stays in the watertight booth is secured, additional inspection may be performed on various electric components such as a rain sensor and wiper interworking inspection.

In addition, when it is determined that a vehicle position is the watertight booth exit position, the diagnostic terminal 10 may perform transmit an inspection command message in the manner described above, and when an operating signal is received, the diagnostic terminal 10 may perform inspection such as tailgate latch and door unlock at S5.

When a barcode is recognized by the second scanner SC #2 located on the exit side of the watertight booth and the second diagnostic communication is connected to the inspector 30 through the second antenna 22, the vehicle ID and the stored inspection results are transmitted to the inspector 30 at S6.

Here, the inspector 30 may transfer a vehicle whose inspection result is normal (OK) to the driving inspection process or may cause a vehicle with a poor inspection result (NG) to enter the repair process.

For the vehicle entering the repair process, an NG item in reporting information of the inspection results is checked, and then the vehicle is re-inspected. When the vehicle normally passes the re-inspection (OK), the vehicle is transferred to a driving inspection process at S7. Thereafter, the diagnostic terminal 10 may be removed from the vehicle when the vehicle inspection is completed or the driving process is completed.

Through this, the problem in which errors/defects that occur when the electric loads are simultaneously inspected are not tracked in the related art may be solved, and man hour of the repair process may be reduced by checking only NG items in the reporting information of the inspection results.

FIGS. 6A and 6B show an automated electric load items compared to manual inspection of the related art according to an exemplary embodiment of the present disclosure.

Referring to FIG. 6A, the related art has various problems due to a limitation in the number of applied inspection items and performing simultaneous inspection due to a process cycle time by limiting the manual current inspection of door glass rise/fall, head lamps, tail lights, fog lights, and various brake lamps, the automatic current inspection such as engine cooling fans, turn signal lamps, daytime running lights, central door lock/unlock, and the like, sensor data such as vehicle VIN, TPMS valve ID, battery charge/discharge amount, refrigerant pressure reading, and DTC inspection (failure code) such as engine, transmission, airbag, ABS, MDPS, and the like to the final inspection line.

In contrast, referring to FIG. 6B, in the automated vehicle inspection method according to an exemplary embodiment of the present disclosure, electric load inspection with improved accuracy and reliability may be performed by automating the existing manual current inspection according to an additionally secured process cycle time in the watertight booth and adding a major safety component related inspection item.

In addition, quality inspection management specifications of electric components may be strengthened by preventing errors due to external factors when inspecting an operating current of the electric components and ensuring consistency of inspections results according to individual component inspection, and field claims may be improved by preventing defective products.

In addition, since electric component inspection of a vehicle is automated in the final inspection line utilizing the watertight booth, a spare plant site due to elimination of the final inspection line may be secured and cost reduction effects based on reduction in manpower may be expected.

The exemplary embodiments of the present disclosure may not necessarily be implemented only through the foregoing devices and/or methods but may also be implemented through a program for realizing functions corresponding to the configurations of the exemplary embodiments of the present disclosure, a recording medium including the program, or the like. Such an implementation may be easily conducted by a person skilled in the art to which the present disclosure pertains from the foregoing description of exemplary embodiments.

The exemplary embodiments of the present disclosure have been described in detail, but the scope of the present disclosure is not limited thereto and various variants and modifications by a person skilled in the art using a basic concept of the present disclosure defined in claims also belong to the scope of the present disclosure.

While this disclosure has been described in connection with what is presently considered to be practical exemplary embodiments, it is to be understood that the disclosure is not limited to the disclosed exemplary embodiments. On the contrary, it is intended to cover various modifications and equivalent arrangements included within the spirit and scope of the appended claims.

The invention claimed is:

1. An automated vehicle inspection system utilizing a watertight booth process line of a manufacturing plant, the automated vehicle inspection system comprising:
   a diagnostic terminal mounted in a vehicle and connected to an engine control unit (ECU) of the vehicle through a vehicle communication network, the diagnostic terminal sequentially operating individual electric components through the ECU based on a stored electric component inspection items while the vehicle passes through a watertight booth, and the diagnostic terminal receiving individual operating currents measured accordingly to determine whether the electric components normally operate;
   a transceiver connecting to the diagnostic terminal and a wireless diagnostic communication network through an antenna disposed in the watertight booth process line; and
   an inspector recognizing a vehicle ID of a vehicle that enters the watertight booth, the inspector transmitting inspection items according to a vehicle type and specification of the vehicle ID to the diagnostic terminal through the diagnostic communication network, and the inspector further recognizing a vehicle ID of a vehicle that leaves the watertight booth to collect inspection results determined in the diagnostic terminal.

2. The automated vehicle inspection system of claim 1, wherein the diagnostic terminal is a wireless on-board diagnostics (OBD)-based terminal and is equipped with an electric load inspection program for inspecting an individual electric component based on the inspection items.

3. The automated vehicle inspection system of claim 1, wherein the diagnostic terminal includes:
- a vehicle communication module connected to the ECU through the vehicle communication network via a gateway of the vehicle;
- a wireless diagnostic communication module connected to the antenna of the transceiver through the diagnostic communication network of a short-range wireless communication method;
- a position recognition module measuring a position of the vehicle using at least one of differential global positioning system (DGPS) and an ultra-wideband (UWB);
- a memory module storing an electric load inspection program for vehicle inspection, the inspection items, and the inspection results; and
- a control module recognizing a position of the vehicle that enters the watertight booth through the position recognition module and controlling electric load inspection according to execution of the electric load inspection program.

4. The automated vehicle inspection system of claim 3, wherein the vehicle communication module transmits an operating signal for each electric component according to the inspection items to the ECU through the vehicle communication network, and receives an operating current measured by a battery sensor according to an operation of a corresponding electric load from the ECU.

5. The automated vehicle inspection system of claim 3, wherein the antenna comprises a first antenna provided on an entrance side of the watertight booth and a second antenna provided on an exit side of the watertight booth; and
- wherein the wireless diagnosis communication module is connected to the first antenna through a first diagnostic communication network to receive the inspection items, and is connected to the second antenna through a second diagnostic communication network to transmit the inspection results.

6. The automated vehicle inspection system of claim 3, wherein the position recognition module recognizes a watertight booth entry position, watertight booth internal position, and watertight booth exit position of the vehicle based on vehicle position information and map information of the watertight booth process line.

7. The automated vehicle inspection system of claim 3, wherein the control module generates an inspection command message including an electric component identification code, an operating signal, and an operation time according to an inspection sequence based on the inspection items and transmits the generated inspection command message to the ECU.

8. The automated vehicle inspection system of claim 7, wherein the control module sequentially transmits a left (LH) brake lamp inspection command message, a right (RH) brake lamp inspection command message, and a central brake lamp (high mounted stop lamp (HMSL)) inspection command message according to the inspection items through the vehicle communication network, and compares received individual operating currents with reference ranges set for the respective lamps to determine whether the individual operating currents are normal within upper and lower limits.

9. The automated vehicle inspection system of claim 1, wherein the inspector recognizes the vehicle ID of the vehicle that enters the watertight booth through a first scanner (SC #1) installed on an entrance side of the watertight booth, the inspector being connected to the diagnostic terminal through a first diagnostic communication network, and the inspector transmits the inspection items matched to the vehicle ID.

10. The automated vehicle inspection system of claim 1, wherein the inspector recognizes the vehicle ID of the vehicle that leaves the watertight booth through a second scanner (SC #2) installed on an exit side of the watertight booth, the inspector being connected to the diagnostic terminal through a second diagnostic communication, and the inspector collects inspection results matched to the vehicle ID.

11. The automated vehicle inspection system of claim 1, further comprising:
- a manufacturing execution system (MES) matching and managing the electric component inspection items applied to a vehicle according to a vehicle type and specification of the vehicle mass-produced in the manufacturing plant, an OBD ID of the diagnostic terminal mounted in the vehicle, and the vehicle ID, and providing the matched electric component inspection items, the OBD ID, and the vehicle ID to the inspector.

12. The automated vehicle inspection system of claim 11, wherein the inspector inquires the MES about vehicle information by a vehicle ID recognized at each spot of the entrance and exit of the watertight booth to recognize a matched OBD ID, and is connected to the diagnostic communication network through authentication of the OBD ID of the diagnostic terminal requesting access from the antenna.

13. An automated vehicle inspection method utilizing a diagnostic terminal mounted in a vehicle completely assembled in a process line, the method comprising the following steps:
- a) receiving electric component inspection items matched to a vehicle ID from an inspector when a first diagnostic communication network is connected through a first antenna provided on an entrance side of a watertight booth during transportation of the vehicle;
- b) recognizing a position of the vehicle and initiating automated inspection according to an electric load inspection program when a watertight entry position is recognized;
- c) sequentially operating individual electric components based on the inspection items while the vehicle is passing through the watertight booth, and inspecting corresponding individual operating currents to determine whether the individual electric components normally operate; and
- d) transmitting the vehicle ID and determined inspection results to the inspector when a second diagnostic communication network is connected through a second antenna provided on an exit side of the watertight booth.

14. The automated vehicle inspection method of claim 13, wherein step b) further includes:
- causing the vehicle to enter an IG ON mode and supplying power to various electric loads;
- transmitting a door glass inspection signal to the ECU through the vehicle communication network, before entering the watertight booth, to operate a door glass; and
- receiving an operating current measured in a battery sensor of the vehicle.

15. The automated vehicle inspection method of claim 13, wherein step c) further includes:
- sequentially transmitting a left (LH) brake lamp inspection command message, a right (RH) brake lamp inspection command message, and a central brake lamp (high mounted stop lamp (HMSL)) inspection command message based on the inspection items through the vehicle communication network and receiving corresponding individual operating currents; and comparing the individual operating currents with reference ranges set for the respective lamps to determine a normal operation and storing collected inspection results.

16. The automated vehicle inspection method of claim 13, further comprising:

inspecting an operation of a tailgate latch and a door unlock function when the position of the vehicle is recognized and corresponds to a watertight booth entry spot or a watertight booth exit spot, between step b) and step c).

17. The automated vehicle inspection method of claim 13, wherein step c) further includes:

recording an item failed (NG) for inspection in reporting information of the inspection result.

* * * * *